Figure 1:
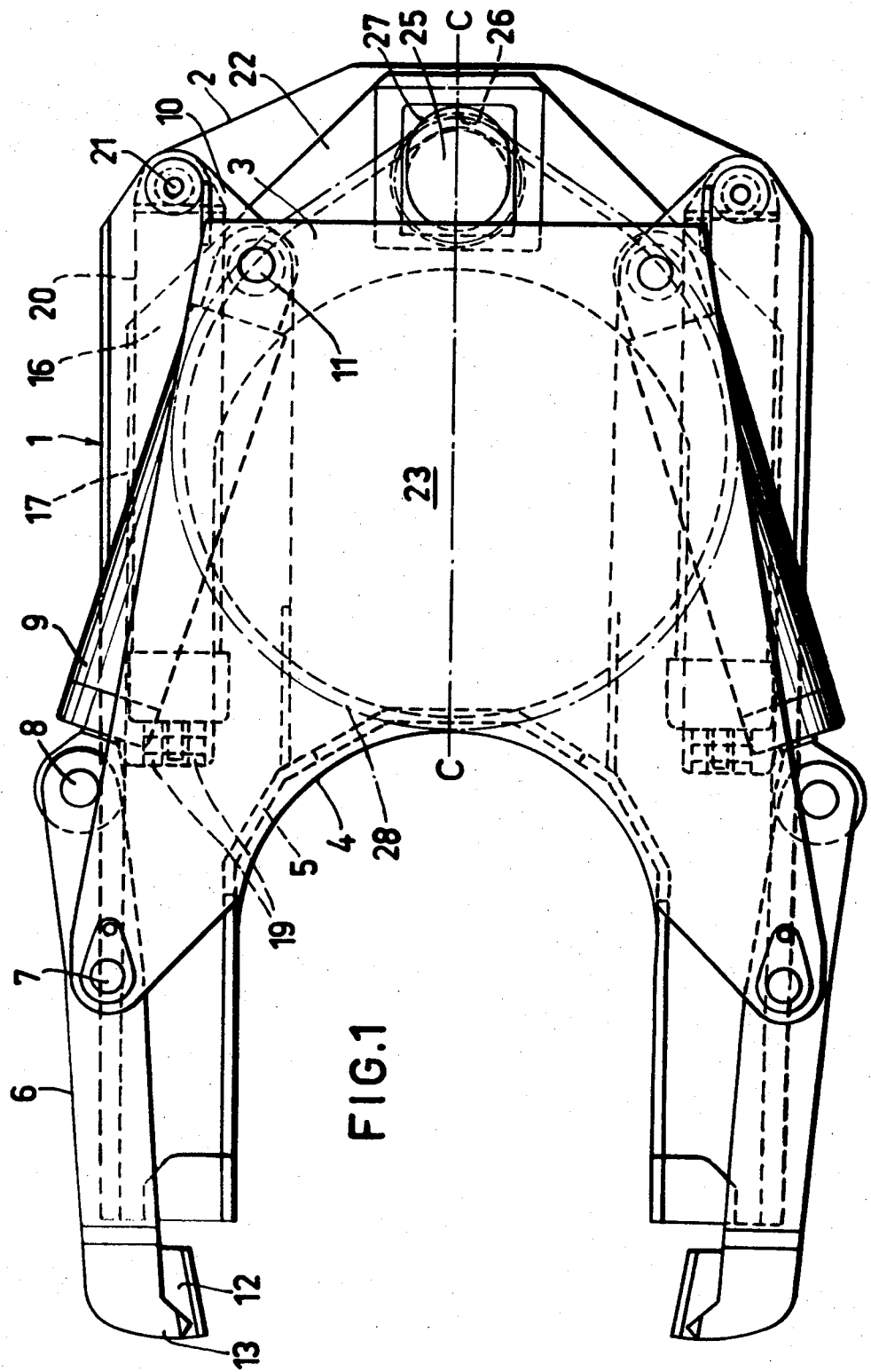

United States Patent

Runeson

[15] 3,688,816
[45] Sept. 5, 1972

[54] ARRANGEMENT AT TREE FELLING UNIT

[72] Inventor: Stig Olof Runeson, Alfta, Sweden
[73] Assignee: Ostbergs Fabriks AB, Akfta, Sweden
[22] Filed: June 15, 1970
[21] Appl. No.: 46,180

[30] Foreign Application Priority Data

June 19, 1969 Sweden ..................8752/69

[52] U.S. Cl..........143/32 N, 144/34 R, 144/309 AC
[51] Int. Cl.........................B27b 17/00, A01g 23/08
[58] Field of Search....143/32, 32 N; 144/34 R, 34 B, 144/34 E, 3 D, 309 AC

[56] References Cited

UNITED STATES PATENTS

| 3,140,736 | 7/1964 | Propst | 144/3 D |
| 3,565,138 | 2/1971 | Albright | 143/32 R |

FOREIGN PATENTS OR APPLICATIONS 542,508  3/1922  France......................143/32 N

*Primary Examiner*—Donald R. Schran
*Attorney*—Pierce, Scheffler & Parker

[57] ABSTRACT

The invention relates to a tree felling unit of the type at which a frame supports arms for pressing the tree stem against a stop member on the frame, whereafter cutting is effected by means of a cutting device supported by the frame. The invention shows the improvement that the cutting device is an endless saw chain driven along a guiding edge of a disc slidable along a straight track in the frame and drivable against the tree stem with the guiding disc edge facing the stem. Hereby a unit is obtained having the advantages of the shear knife, such as compact dimensions and directed felling effect, but not its disadvantages, such as damages on the surface wood and requirements on a very high driving effect.

15 Claims, 2 Drawing Figures

ARRANGEMENT AT TREE FELLING UNIT

This invention relates to an arrangement at tree felling units comprising gripping or counterholding arms for catching a felled stem and pressing it against a stop member on the frame of the felling unit and thereafter cross-cutting it by a cutting device in the form of a saw guide bar with saw chain, sprocket wheel and drive means for said wheel, which cutting device is movable against the stem held caught.

Compared with cutting devices as shear blades, the guide bar supported saw chain requires considerably less drive power and spares the surface wood in the final felling phase, but the known constructions - represented for example by the felling mechanism according to U.S. Pat. No. 3,102,563 - are far more bulky than the shear blade arrangement, do not have its predetermined felling direction and give rise to an unreasonable chain wear or to the risk of locking the return strand of the saw chain by pinching it off when sawing through the stem.

The advantages of the shear blade and saw chain arrangements are combined and their disadvantages are eliminated by the arrangement according to the invention, which is characterized in that the sides of the frame are designed to form for the lateral parts of a carrier means a straight slide and guide track directed to the stop member, which carrier means serves as a holder for a disc acting as saw guide bar and having an extension in the longitudinal and transverse direction of the track exceeding the expected maximum stem diameter, and supports a sprocket wheel with drive means, and that drive means are provided for driving the carrier means in the direction against the stop member.

Figure 2:
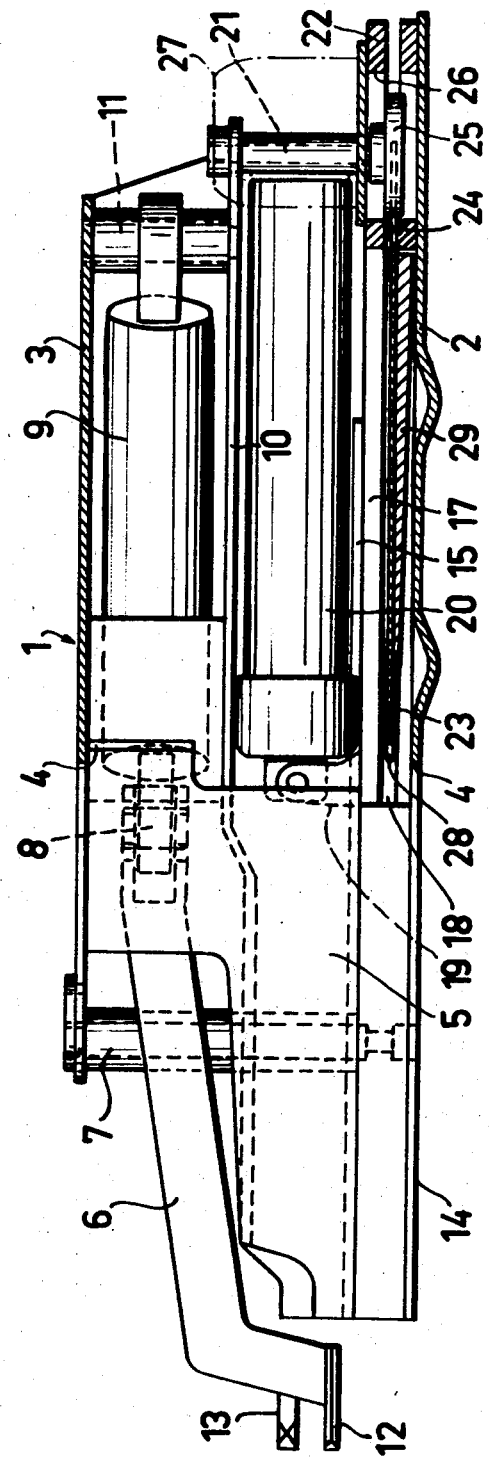

The invention is described in greater detail in the following, with reference to the accompanying drawing, in which FIG. 1 shows a plane view of a tree felling arrangement according to the principles of the invention, and FIG. 2 shows a longitudinal section through the felling arrangement along the symmetry line C—C.

The frame, generally designated by 1, which for example can be supported on a crane jib of a working vehicle, is built up of a bottom plate 2 and in parallel thereto an upper plate 3 which in the front part have concave recesses 4 serving as tree stops and are held together by several distance plates placed on edge, of which one is shown at 5. On each side of the symmetry line C—C of the frame a grip or counterholding arm 6 is mounted closer to its center about an axle 7 secured between the upper and bottom plate at some distance from the recess 4. The rear end (right-hand end in the FIG.) of the arm 6 is mounted in point 8 at the piston rod of a hydraulic means 9, the cylinder end of which mounted about an axle 11 secured between the upper plate 3 and an intermediate plate 10. The counterholding arm 6 is provided at its free end with an inwardly facing knife 12 and a claw 13 placed above said knife. The bottom plate 2 is provided on both sides of the line C—C with projecting portions 14 in connection to the recess 4, which portions are stayed by an extension of the aforementioned distance plate 5 and form a guide track for the caught tree stem inwards to the recess 4 as well as a part of the slide track for the cutting means described below.

Above each longitudinal edge of the bottom plate 2 and in parallel thereto extend guide plates 15 (FIG. 2). In the passageways thus formed run the respective legs 17 of a yoke-shaped carrier means 16 (FIG. 1), each of which legs is provided with a groove 18 facing the line C—C. Ears 19 projecting upwardly from the front end of the leg serve as a mounting for the piston rod end of a hydraulic means 20, the cylinder end of which is mounted about an axle 21 secured in the rear part of the frame 1 between said intermediate plate 10 and the bottom plate 2.

In the yoke 22 of the yoke-shaped carrier means 16 the rear end of a substantially circular saw guide bar 23 is mounted which has an opening 24 (FIG. 2) for a sprocket wheel 25. Said wheel is supported, via its axle extending through an opening 26 in the yoke 22 corresponding to the opening of the saw guide bar, by a hydraulic motor 27 supported on the edge of opening 26. The position of said motor and thereby that of the sprocket wheel can be adjustable in relation to the saw guide bar 23 for controlling the tension of the saw chain 28 laid about the sprocket wheel and the guide bar. The guide bar (inclusive of the saw chain) is guided on its both sides by respective grooves 18 in the yoke legs 17. At the lower surface of the guide bar (23) a wedge element 29 (FIG. 2) running free of the legs is so mounted that the guide bar is given increasing thickness towards its rear end.

The ducts to the two sets of hydraulic means and the hydraulic motor are not shown in order not to render the Figures unnecessarily complicated. It is here only to be mentioned that the hydraulic means for the counterholding arms are fed via a first control means, and that the hydraulic means for the sliding motion of the cutting device and the hydraulic motor for the saw chain operation are fed via a second control means.

The arrangement described above operates as follows:

The frame 1 carrying the different components, which frame in this case is assumed to be suspended freely mounted at the end of, for example, a crane jib on a tractor, is operated against a tree so that the tree stem is caused to run in against the recess (stop) 4 in the front end of the frame. Thereafter the hydraulic means 9 is caused by the first control means so to swing the counterholding arms 6 that they embrace the stem and press it against the stop member. Hereby both the knife 12 and the claw 13 engage the stem.

In the next step the second control means so is actuated that the hydraulic motor 27 starts the sprocket wheel 25 to rotate for driving the saw chain 28 around the guide bar 23. In connection thereto the hydraulic means 20 drive the yoke-shaped carrier means 16 along the longitudinal edges of the frame 1 in the direction to the stem from the starting position shown in the Figures, for which position the saw chain is in contact with the inner outline of the recess 4. For ensuring that at a simultaneous start of the hydraulic means 20 and hydraulic motor 27 the motor under all circumstances will take up speed before the saw chain meets greater resistance, it can be suitable to provide some play between the inner outline of the recess 4 and the saw chain in its starting position. As an alternative, the start of the hydraulic means 20 can be delayed somewhat relative to the start of the hydraulic motor, for example by means of a hydraulic accumulator.

When thus the guide bar mounted in the yoke 22 of the yoke member is being driven forward, the stem is sawn through while being guided by the yoke legs 17 along the forwardly projecting parts 14 of the bottom plate 2. Owing to the wedge element 29 attached below the guide bar 23 the tree during the continued sawing is given an inclination in the direction away from the frame. When the stem has been sawn through all the way to near the marking cut made by the knife 12, the stem falls with adhering frame, which thereby turns. The felling, thus, is given an accurate direction. The tree resting with its top end on the ground can now be drawn by operation of the crane jib (or tractor) to a storage site, whereby the claw 13 engaging the stem prevents the tree from sliding out of the pressing engagement with the frame recess 4.

As the sawing resistance can vary considerably depending on the tree species and season (in winter time the resistance may be up to twice as high as in summer time) it may be suitable to provide a means for adjusting the relation between the feed speed and saw chain speed. This can be effected by an adjustable proportional flow distributor of conventional type, placed between the hydraulic motor and the hydraulic feed means. The manual setting of the flow distributor to a distribution of flow suitable at the prevailing conditions possibly can be replaced by an automatic setting, for example by controlling the adjusting means of the distributor by the pressure at the hydraulic motor via a pilot line.

The invention is not restricted to the embodiment shown, but different modifications are possible within the scope of the invention, particularly by an exchange of the details shown against components of equivalent function. Especially the slide track for the unit comprising the guide bar, sprocket wheel and its drive means can be varied within wide limits. It is not necessary, either, that the saw guide bar has a strictly circular shape, even if this shape apparently renders possible the most compact construction for a given maximum stem dimension, but it may also have a generally triangular shape with one edge side facing forwards to the tree. The frame, furthermore, may be mounted more or less rigidly at its suspension means, and the counterholding arms may engage at a level below the working level of the knife so that the tree falls freely.

I claim:

1. In a tree felling unit arrangement comprising gripping or counterholding arms for catching a tree stem and pressing it against a stop member on the frame of the felling unit and thereafter crosscutting it by a cutting device in the form of a saw guide bar with saw chain, sprocket wheel and drive means for said wheel, which cutting device is movable against the stem held caught, the improved construction wherein the sides of the frame are designed to form for the lateral parts of a carrier means a straight slide and guide track directed to the stop member, which carrier means serves as a holder for a disc acting as saw guide bar and having an extension in the longitudinal and transverse direction of said track exceeding the expected maximum stem diameter, and supports a sprocket wheel with drive means and that drive means are provided for driving the carrier means in the direction against the stop member, and which carrier means is shaped like a yoke, the legs of which are slidably mounted along the lateral edges of the frame and hold between themselves the respective lateral edges of the disc supporting the saw chain, the yoke portion serving as a mounting for the disc and as a holder for the sprocket wheel with drive means.

2. Arrangement according to claim 1, wherein the drive means for the sprocket wheel is a hydraulic motor supporting said wheel, and the drive means for driving the carrier means comprises hydraulic means preferably placed on both sides of the disc and engaging between respective fixed points on the frame and the movable carrier means.

3. Arrangement according to claim 1 or 2, characterized in that the drive means for the sprocket wheel is a hydraulic motor supporting said wheel, and the drive means for driving the carrier means comprises hydraulic means preferably placed on both sides of the disc and engaging between respective fixed points on the frame and the movable carrier means.

4. Arrangement according to claim 3, wherein it comprises two additional hydraulic means each placed adjacent one of the two hydraulic means for operating respective counterholding arms mounted in the frame.

5. Arrangement according to claim 4, wherein the outer ends of the counterholding arms are provided with knives for effecting a marking cut immediately above the action plane of the saw chain.

6. Arrangement according to claim 5, in which the counterholding arms engage above the action plane of the saw chain, and the frame is pivotally suspended for participating in the felling motion of the tree, characterized in that the knife is completed by an overlying claw for fixing the felled tree when it is being drawn in.

7. Arrangement according to claim 1, characterized in that the disc is substantially circular.

8. Arrangement according to claim 1, characterized in that the disc at least locally has a thickness successively increasing towards the rear end.

9. Arrangement according to claim 8, wherein a wedge element is attached on the lower surface of the disc for effecting said increase in thickness.

10. Arrangement according to claim 2, in which it comprises two additional hydraulic means each placed adjacent one of the two hydraulic means for operating respective counterholding arms mounted in the frame.

11. Arrangement according to claim 1, wherein the outer ends of the counterholding arms are provided with knives for effecting a marking cut immediately above the action plane of the saw chain.

12. Arrangement according to claim 4, at which the counterholding arms engage above the action plane of the saw chain, and the frame is pivotally suspended for participating in the felling motion of the tree, characterized in that the knife is completed by an overlying claw for fixing the felled tree when it is being drawn in.

13. Arrangement according to claim 1, wherein the disc is substantially circular.

14. Arrangement according to claim 1, wherein the disc at least locally has a thickness successively increasing towards the rear end.

15. Arrangement according to claim 7, wherein a wedge element is attached on the lower surface of the disc for effecting said increase in thickness.

* * * * *